United States Patent [19]

Nienaber

[11] 4,356,471
[45] Oct. 26, 1982

[54] GAS PEDAL MOVEMENT DAMPER

[76] Inventor: Heinrich Nienaber, Klusenweg 10, D-584 Schwerte, Fed. Rep. of Germany

[21] Appl. No.: 205,501

[22] Filed: Nov. 6, 1980

[30] Foreign Application Priority Data

Nov. 8, 1979 [DE] Fed. Rep. of Germany ... 7931507[U]

[51] Int. Cl.³ .......................... B60Q 1/54; G08B 21/00
[52] U.S. Cl. .................................. 340/52 R; 180/335; 200/61.89; 340/52 D; 340/66
[58] Field of Search .................... 340/52 R, 52 D, 66, 340/79, 94; 200/61.89; 180/335, 90.6

[56] References Cited

U.S. PATENT DOCUMENTS

| | | | |
|---|---|---|---|
| 2,301,584 | 11/1942 | Rodrick | 340/52 R |
| 2,592,221 | 4/1952 | Whitted | 180/90.6 X |
| 2,662,132 | 12/1953 | Crowe et al. | 340/52 R X |
| 2,743,329 | 4/1956 | Vartanian | 340/52 R X |
| 3,300,604 | 1/1967 | Straub | 200/61.89 |
| 3,366,194 | 1/1968 | Walker et al. | 340/52 R X |
| 3,409,101 | 11/1968 | Williams | 200/61.89 X |
| 3,676,844 | 7/1972 | Hendrickson | 340/66 X |
| 3,846,599 | 11/1974 | Fontain | 200/61.89 |
| 3,921,750 | 11/1975 | Shames | 200/61.89 X |
| 4,250,485 | 2/1981 | Mostert et al. | 340/52 R |

FOREIGN PATENT DOCUMENTS 617748 2/1961 Italy .................................. 200/61.89

*Primary Examiner*—James J. Groody
*Assistant Examiner*—Joseph E. Nowicki
*Attorney, Agent, or Firm*—Hill, Van Santen, Steadman, Chiara & Simpson

[57] ABSTRACT

A gas pedal movement dampening arrangement has a spring assembly disposed on a base plate located directly beneath the gas pedal for a motor vehicle. In one embodiment, the damping unit comprises a spherical hollow elastic body having an air outlet nozzle which affords a linearly progressively increasing resistance force to further downward movement of a gas pedal until beyond a certain point whereupon the resistance force decreases. This enables free movement to full-throttle positions of the gas pedal if such is desired. In another embodiment, the damper unit comprises a spring assembly with a U-shaped spring biasing against downward movement of the gas pedal. Switch means operating upon movement of the gas pedal are also provided for controlling an indicator system informing the vehicle operator of his driving condition as a function of gas pedal movement. In a further embodiment, the damper unit and switch means are contained within a hemispherically shaped hollow body which is engageable by the gas pedal.

5 Claims, 5 Drawing Figures

GAS PEDAL MOVEMENT DAMPER

BACKGROUND OF THE INVENTION

1. Field of the Invention

The invention relates to a mechanism for damping movement of a gas pedal in a motor vehicle for the purpose of inhibiting unnecessarily rapid acceleration and reducing fuel consumption.

2. The Prior Art

In the case of motor vehicle engines, particularly carburetor and diesel internal combustion engines, rapid movement and/or heavy pressure on the vehicle gas pedal often leads to unnecessarily excessive use of fuel during operation of the motor vehicle. Gas pedal movement dampers have been developed for preventing a too rapid engagement of gas pedals by vehicle operators and for inhibiting unnecessarily deep movement of the pedal. One such known damper device is described in German AS No. 2152573.

The present invention serves as an improvement to known pedal damper constructions and provides for a simplified arrangement which is suitable for adaptation by a vehicle owner to a vehicle not having an originally installed damper device.

SUMMARY OF THE INVENTION

A gas pedal damper unit is constructed with a base plate mounted on the floorboard beneath the pedal and has a damper assembly disposed on the base plate and extending upward in facing relation with a bottom surface of the pedal. The bottom surface of the pedal may have extending downwardly therefrom an engagement surface for contacting the damper assembly as the pedal is applied nearer to the floorboard. The damper assembly provides a resistant force in the case of rapid downward movement of the gas pedal, but permits a vehicle operator to fully depress the gas pedal when driving conditions so require.

In one form of the invention, the damper assembly is a spherically shaped, hollow elastic body mounted in a cup element such that substantially the upper half of the elastic body extends upwardly out of the cup. The lower surface of the elastic body is formed with an air nozzle and air ports are formed along sidewalls of the cup, thereby affording air flow passage means between ambient and the hollow interior of the elastic body. The cup is fixed onto the base plate member. Spacing means prevent complete occlusion of the elastic body nozzle should the body become compressed against the bottom wall surface of the support cup. The inherent resilience of the elastic body serves as an especially simple damper arrangement which is economical and compact. During engagement of the gas pedal with this damper assembly, the resistance force provided by the elastic body does not increase geometrically, as would be the case with a completely closed elastic body, but increases linearly initially and later actually decreases with further inward movement of the upper surface of the elastic body, wherein the upper surface deflects inwardly of the body in telescoping fashion with the lower surface portion thereof. Accordingly, the return force of the elastic body at the end of gas pedal movement is very low, thereby preventing a rapid deceleration bias against the bottom surface of the pedal. It is also possible to utilize a cylindrically shaped, elastic hollow body having sidewall surfaces folded in accordion fashion, rather than a spherical body. It is also possible to form the elastic hollow body as a hemisphere in order to diminish the vertical height of the damper assembly.

In another variation of the invention, the damper assembly may be constructed with a U-bent or shaped leaf spring in order to provide a linearly increasing resistance in spring force against downward movement of the gas pedal.

The invention further includes a position indicator switch arrangement in which switch contact is made upon pedal engagement with the damper engagement. The switch connects an indicator lamp circuit whereby the vehicle operator may be informed as to the position of the gas pedal and that he is moving into a range of high fuel consumption. The switch arrangement may be in the form of an interior spring and outer spring having free ends in facing relationship. Switch contacts are fixed at each of the free ends. The inner and outer springs would serve simultaneously as damper assembly members and the switch throw mechanism. The interior spring extending to a height less than the outer spring, switch contact is not made until after a predetermined depression of the outer spring by the gas pedal has occurred.

DESCRIPTION OF THE PREFERRED EMBODIMENTS

Figure 1:
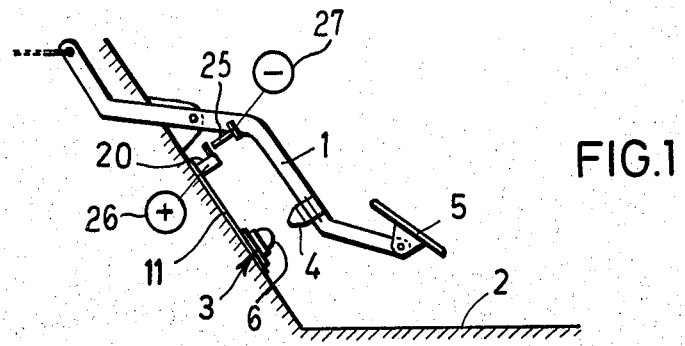
FIG. 1 is a side elevational view of a gas pedal movement damper in accordance with the present invention installed along the floorboard of a motor vehicle.
Figure 2:
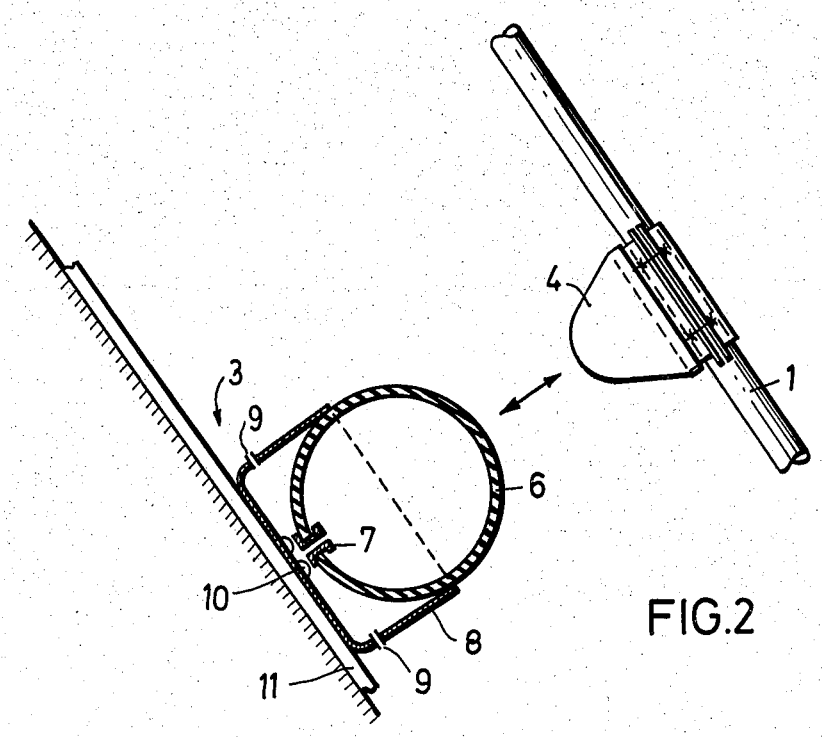
FIG. 2 is a cross-sectional side elevational view illustrating a spherical elastic body damper assembly for the gas pedal damper unit of FIG. 1.
Figure 3:
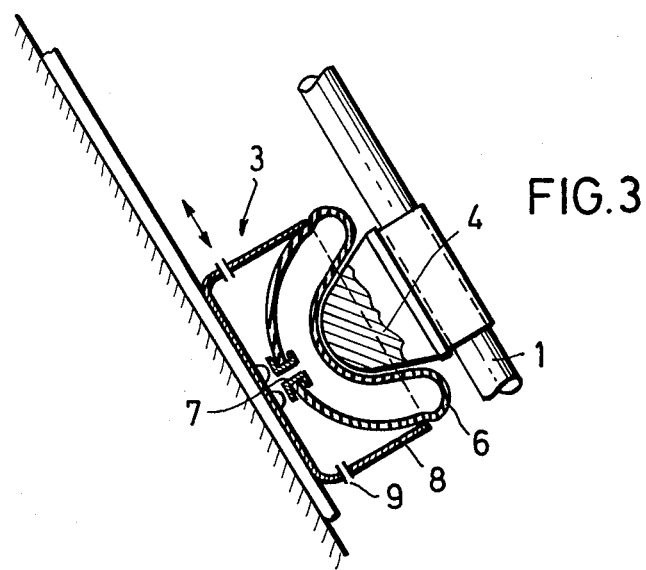
FIG. 3 is a cross-sectional side elevational view illustrating the spherical elastic body during full-throttle or full gas pedal depression.

FIGS. 1-3 illustrate one gas pedal damper construction contemplated by the present invention. A motor vehicle gas pedal 1 is located in conventional fashion along the floorboard 2 of the vehicle operator's area. Along the floorboard surface beneath the gas pedal 1, a damper unit 3 is fixed upon a base plate member 11. The damper unit 3 may be mounted upon the base plate and the base plate may be fixed to the floorboard surface by fastening means, such as metal screws (not shown). Situated along the gas pedal at a position directly over the damper unit assembly 3 is an engagement surface 4. A footboard 5 is located at the free end of the gas pedal to receive the vehicle operator's foot for depression of the gas pedal in a well-known manner.

The damper unit 3 comprises a generally spherical hollow body 6 made of elastic material, preferably rubber. An upper surface of the elastic body faces directly with the engagement surface 4 such that downward movement of the gas pedal 1 causes the engagement surface to contact and deform the hollow body 6. With particular reference to FIG. 2, which is an approximate actual scale illustration, a bottom region of the elastic body 6 contains an air outlet in the form of a nozzle means 7. The body 6 is mounted in press-fit relation in a cylindrically shaped cup means 8. The sidewalls of the cup contain air ports 9 in order to prevent a free flow of air through the nozzle 7, spacing abutments 10 are formed on the bottom surface of the cup 8. In this manner, air passage means are formed for a free flow communication of air between the hollow interior of the elastic body 6 and ambient.

When the gas pedal 1 is depressed downward by the operator for increased fuel flow to the motor vehicle engine, the engagement surface 4 deforms the upper part of the elastic body 6 in the manner shown in FIG. 3. The engagement surface causes the upper elastic body portion to extend inwardly of the hollow body in a telescoping fashion. The tip of the engagement surface 4 has a rounded-off configuration for contact with the elastic body in order to prevent puncturing of the body. In cases where the hollow body has a more flat upper surface, such as where the hollow body is in the form of a cylindrical member with accordion-style folded sidewalls, the engagement surface 4 may be eliminated entirely, with an attendant change in operational arc length or a compensation in height of the elastic body to make up for the loss of engagement surface height. As the gas pedal begins engagement with the elastic body 6, the inherent resilience of the body biases against further downward movement of the pedal in a linearly increasing manner. However, air expulsion from the body interior through the nozzle 7 and out air ports 9 permits further movement of the pedal. At a point of further downward movement shown in FIG. 3, the return force of the elastic body 6 progressively decreases in order to make possible a rapid acceleration of the motor vehicle when necessary, such as when passing other vehicles on the road, crossing and intersection, or other suitable driving conditions. Furthermore, the reduction in the return bias of the damper unit 3 prevents unnecessarily rapid deceleration as the operator relieves foot pressure on the gas pedal.

At an upper end of the base plate between the gas pedal 1 and the floorboard surface, there is arranged a switch 20 from which there is electrical connection to a signal device 26, which may be an optical indicator, such as a lamp, or an acoustical warning mechanism. The switch 20 may be constructed as a simple on-off switch or as a multi-contact switch if, for example, plural signal lamps of different colors, different relative gas pedal positions (e.g., ¾ fuel, 9/10 fuel, full-throttle fuel, etc.), or the like are to be indicated. Spaced upwardly from the switch 20 and fitted onto the undersurface of the gas pedal 1 is a contact member 25 for contact engagement with the switch. The element 25 is electrically connected to an electrical source 27, such as the motor vehicle battery. By means of this indicator switch system, the operator is made aware of the different driving conditions, such as fuel-saving driving, high-speed driving, or full-throttle engine running, resulting from varying degrees of movement of the gas pedal 1.

Figure 4:
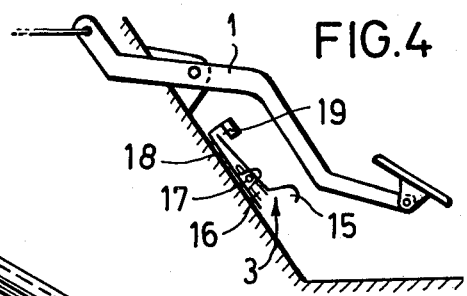
FIG. 4 is a side elevational view of a gas pedal movement damper unit according to the present invention wherein the damper assembly is a U-shaped leaf spring.

FIG. 4 shows another embodiment of the present invention where the damper unit 3 utilizes a spring assembly having a U-shaped or vent steel spring 16. The unit is located beneath the gas pedal mounted upon a base plate 18. The U-shaped spring 16 is located below a pivotally moving arm 15 having an upraised forward end portion on which the gas pedal 1 directly acts. The pivot arm 15 rotates about a pivot bar 17. Adjacent the rear end of the pivot arm 15 is an on-off switch 19 for completing an indicator circuit of the type described above. This arrangement provides for a very compact construction and, due to the continuously linear return force provided by the spring 16, inhibits lengthy application of a full-throttle gas pedal position and affords a more rapid return of the gas pedal to a less than full-throttle position.

Figure 5:
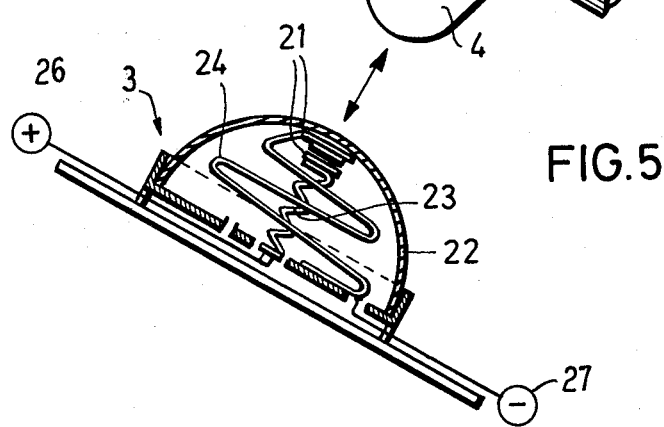
FIG. 5 is a cross-sectional side elevational view of a hemispherically shaped elastic body having a facing spring arrangement therein for affording resilient bias against downward movement of the gas pedal and contact switch mechanism utilizing contact members on each of the facing springs.

FIG. 5 shows another embodiment of the present invention where a hemispherically shaped hollow body 22 is located beneath the gas pedal engagement surface 4 and contains therein a spring assembly and indicator switch means. The switch means comprises space-apart contact plates 21 which are fitted at the free ends of an inner helical spring 23 and a helical return spring 24 having its free end extending over the free end of the inner spring. The springs 23 and 24 serve to inhibit downward movement of the gas pedal with linearly progressive resistance. The hollow body 22 is formed of yielding material.

As shown in FIG. 5, the inner spring contact is in electrical connection with the indicator elements 26. The contact 21 formed at the outer free end of the larger helical spring 24 is in connection with the electrical source 27.

The gas pedal damper units of the present invention are of a compact construction which lends itself to adaptation to a motor vehicle having been previously built without a damper unit. No mounting is necessary on the carburetor, such as would require an expensive fastening apparatus. The invention affords direct action of the damper on the gas pedal so that the reaction of the damper unit is known directly to the vehicle operator. The unit may have a very small structural height so as to be used with motor vehicles having small pedal path arcs.

The present invention is not intended to be limited to the particular construction shown. For example, without departing from the scope of the invention, the gas pedal damper unit may be arranged along an outer surface of the dashboard for operator engagement, just as in the case of pedal movement. It is furthermore possible to construct the switches in the form of induction coils so as to be stepless gas pedal position indicators. In this manner, the invention would enable an operator to know exactly the gas pedal position while simultaneously dampening further movement of the same.

Although various minor modifications may be suggested by those versed in the art, it should be understood that I wish to embody within the scope of the patent warranted hereon all such modifications as reasonably and properly come within the scope of my contribution to the art.

I claim as my invention:

1. Apparatus for damping a motor vehicle operator's movement of a gas pedal comprising a base plate mounted to a floorboard surface beneath the gas pedal, and a damping assembly located on said base plate for engagement with the gas pedal upon downward movement thereof, said damping unit having biasing means for providing a force against the gas pedal, which force progressively increases as the gas pedal is depressed further towards said floorboard surface, wherein said biasing means comprises a spherically shaped, elastic hollow body having at least one air outlet means formed therein.

2. The apparatus of claim 1, further comprising a cylindrically shaped support member for mounting said elastic hollow body therein such that an upper portion of said elastic hollow body extends outwardly from said support member in facing relation with the gas pedal, said support member being fixed to said base plate.

3. The apparatus of claim 2, wherein said at least one air outlet means is positioned along a lower portion of said elastic hollow body and said support member has air ports extending therethrough, such that there is provided air flow communication between the interior of said elastic hollow body and ambient.

4. An apparatus responsive to a motor vehicle operator's depression of a gas pedal comprising a damping unit for resisting downward movement of said gas pedal having a base plate mounted to a floorboard surface beneath said gas pedal and a biasing means fastened to said base plate for providing a force against said gas pedal which progressively increases as said gas pedal is depressed further towards said floorboard surface, and a switch means fastened to said base plate for engagement with said gas pedal for closing an indicator circuit after said gas pedal has reached a predetermined position, wherein said biasing means comprises a spherically shaped, hollow elastic body supported in press-fit relation in a cup member, said hollow elastic body having air outlet means formed in a lower portion thereof and an upper portion thereof extending outward from said cup member in facing relation with said gas pedal, said cup member having air ports extending thereto.

5. The apparatus of claim 4, further comprising an engagement surface fastened to said gas pedal, said engagement surface having a rounded-off tip portion for contacting said upper portion of said hollow elastic body.

* * * * *